Dec. 2, 1958 P. F. SEGUIN ET AL 2,862,787

PROCESS AND APPARATUS FOR THE PREPARATION OF SEMI-CONDUCTORS FROM ARSENIDES AND PHOSPHIDES AND DETECTORS FORMED THEREFROM

Filed July 10, 1953

PAUL SEGUIN AND
FRANCOIS F. GANS

By:

Hinderoth, Lind & Ponack
Attorneys

United States Patent Office 2,862,787

Patented Dec. 2, 1958

2,862,787

PROCESS AND APPARATUS FOR THE PREPARATION OF SEMI-CONDUCTORS FROM ARSENIDES AND PHOSPHIDES AND DETECTORS FORMED THEREFROM

Paul F. Seguin and François F. Gans, Paris, France

Application July 10, 1953, Serial No. 367,334

Claims priority, application France May 27, 1953

6 Claims. (Cl. 23—14)

The present invention relates to a process for the preparation of semi-conductors from arsenides and phosphides as well as rectifying cells for alternating current constructed with these substances.

The development of the applications of semi-conductors has drawn attention to the elements in the fourth column of the periodic table of elements. Among these silicon and especially germanium have been revealed as being the most interesting. They allow manufacturing rectifiers with high characteristics and serve as basic substances for the construction of transistors.

It is known that in order to have the required qualities of a rectifier or of a transistor, a germanium crystal should contain a minimum quantity of one or several suitably chosen impurities. This, or these impurities are formed very generally by an element of the third or the fifth column of the periodic table. If the impurity is an element from the third column whose atoms, scattered in the lattice, are substituted there from place to place, the substance becomes a type P semi-conductor. If the impurity is an element from the fifth column, then it becomes a type N semi-conductor.

The substances of the type P and of the type N rectify the current in opposite directions from one another. They show a thermoelectric power with relation to platinum, and a Hall effect of a different sign and whose absolute value depends upon the proportion of impurities which provides a means for controlling the latter.

Although it is possible, while relying upon these properties, to construct apparatuses operating in a satisfactory way the use of substances such as silicon and germanium is not without various disadvantages.

The possibilities for the use of silicon are more restricted than those of germanium. The latter which is the only one practically used for the manufacture of transistors is rare, costly and its preparation, as its purification, is delicate.

Moreover, the introduction into germanium of quantities of impurities exactly measured is difficult to accomplish with exactness, particularly when it is desired to construct arrangements combining examples of type P and of type N for example in order to construct rectifiers of the type "junction N–P" or transistors called "N–P–N" or "P–N–P."

These various disadvantages have urged the search for substances having characteristics similar to those of germanium but easier to prepare and to treat.

Theoretical considerations suggested that the binary compounds of the elements respectively from the third and from the fifth column of the periodic table should lead to the result sought. This directed attention particularly to the compounds of the substances adjacent to germanium in the periodic table such as the phosphides, arsenides and antimonides of aluminum, gallium and indium.

It is known from Welker (Zeitschrift für Naturforschung, 1952, page 745), who has developed from analogous theoretical considerations that the antimonide of aluminum SbAl and the antimonide of indium SbIn show a very clear rectifying effect. This author has published in the above cited article rectifying curves relative to antimonides of aluminum P and N.

These substances are easy to prepare by a fusion of the two constituents but their character very clearly metallic permits little hope of improving in a notable way their characteristics.

Among the adjacent compounds of germanium, considered above, the arsenides and the phosphides have a less metallic character and do not present these disadvantages but their preparation is impossible by the Welker process. In fact arsenic and phosphorous only react at high temperature upon the corresponding metals. The method by fusion can only be applied if it is possible to construct closed chambers, chemically inert and capable of supporting, at temperatures which may reach and even pass 1000° C., the enormous vapor pressures of about 100 atmospheres that the metalloids then have.

In fact, the contemplated compounds have only been prepared very rarely and with great difficulties.

Goldschmidt (Skrifter Utgitt av det Norske Videnskaps Akedemi i Oslo, I, Matematisk Naturvidenskapelig Klasse, 1926, No. 8) is the only author who has described the phosphide and the arsenide of gallium, PGa and AsGa. He prepared them by passing a current of the metalloid vapor entrained by hydrogen over the oxide $Ga_2O_3$ heated to a temperature of about 700° in a quartz tube. This method is difficult to apply particularly with arsenic which has a tendency to condense at any cold point of the circuit, which can obstruct the tube and create a superpressure bursting the apparatus. Such an accident can be extremely dangerous because of the high toxicity of arsenious anhydride which is formed upon contact of arsenic vapor and air. Moreover, if examination with X-rays has permitted Goldschmidt to conclude that the dark gray substance that he thus obtained has indeed a face centered cubic structure, very similar to that of germanium, with a constant lattice and very close interatomic distances (all indications that are found moreover in literature as to this substance appear to have been reproduced from the memoir of Goldschmidt), this author mentions nowhere that the substance prepared has a crystalline macroscopic aspect, but he speaks thereof as a "dark gray mass, very slightly fritted." Moreover, he declared explicitly (page 35 of said memoir) of not having succeeding in combining arsenic and gallium either directly, or by passing over metallic gallium arsenic vapor in a hydrogen current even at temperatures going up to about 800° C. Goldschmidt moreover has not succeeded in preparing by his method the phosphide and arsenide of indium. These latter also have only been described by a single author, Iandelli (Gazzetta Chimica Italiana, 1941, tome 71, page 58). He obtained them by heating the constituent elements in stoichiometric proportions, in a sealed vacuum tube, at temperatures, which undoubtedly from fear of explosion, did not exceed 700°. Iandelli states that even after a time of 350 to 400 hours the reaction was far from being quantitative.

The present invention comprises a process for the preparation and rapid securing of such substances in macroscopical crystallized form without the risk of an explosion. Moreover this process permits varying as desired their composition in the neighborhood of the stoichiometric composition and thus obtaining desired compounds of the type P or type N.

The process set forth in the following is described for the combination of arsenic and gallium as an example, but it is intended that the preparation of every compound of a metal of the third column of the periodic table of elements with arsenic or, preferably with a supplementary precaution which will be indicated below, with phosphorus, comes within the spirit of the present invention. This process can also be generalized for the preparation of compounds of arsenic and phosphorus with elements not easily volatile other than those of the third column for example with metals such as manganese, iron, cobalt and nickel.

With the above and other objects in view which will become apparent from the detailed description below the invention is shown in the drawings in which.

Figure 1:
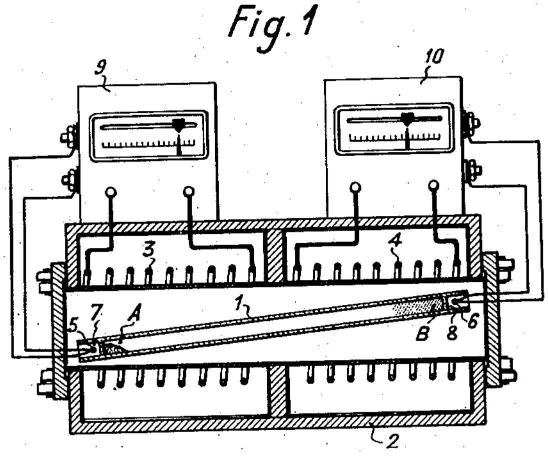
Fig. 1 shows an electrical furnace and a quartz tube designed for the preparation of AsGa.

Arsenic and gallium are introduced in stoichiometric quantities in a quartz tube 1. The tube is then exhausted and hermetically sealed. The tube is placed awry in a furnace 2 comprising two heating windings 3 and 4 located in such a way that its ends A and B of the tube can be carried at different controlled temperatures T and $t$ (T being higher than $t$) and that the intermediary regions of the tube may be carried at temperatures in no case lower than $t$ and in general intermediate between T and $t$ and, if it is higher than T, then it is not such a temperature that the quartz tube may be too strongly softened. These temperatures are measured with the aid of thermocouples 5 and 6 located in the open extensions 7 and 8 of the tube 1. This last arrangement which is convenient in practice is not always essential and any other means allowing the location of the thermocouples 5 and 6 in the immediate neighborhood of the ends of the tube 1 in such a way that they may be carried substantially at the same temperature as the latter can be used. The thermocouples 5 and 6 control the regulatory systems 9 and 10 for the heating of the corresponding portions of the furnace.

The tube 1 is inclined in such a way that the elements introduced initially assemble by gravity at the end A. They are heated to a temperature T of about 1000° C. and the end B is carried at the sublimation temperature of arsenic under the pressure prevailing at the interior of the furnace. In this way the pressures at the interior and the exterior of the quartz tube 1 are equal. In the usual case the chamber of furnace 2 is at atmospheric pressure and $t$ is substantially equal to 610° C., the sublimation temperature of arsenic under atmospheric pressure; for example $t$ is between 600° and 620°. In practice, a certain difference of pressure between the chamber of the furnace and the interior of the quartz tube may be maintained without risk of explosion or collapse of the latter, for example, a difference of pressure of about half an atmosphere. With this tolerance and if the chamber of the furnace is always at atmospheric pressure it will be sufficient to maintain $t$ between 550° and 650°.

The arsenic distills rapidly from the end A towards the end B where it condenses for the greater part according to the Watt cold wall principle while maintaining in the tube 1 a pressure of arsenic vapor in the neighborhood of the pressure prevailing in the chamber of the furnace or at least only different therefrom too slight for bringing about the destruction of the tube, even if the end A is heated for a prolonged period at a temperature where the quartz begins to soften.

One can also operate by allowing initially in the tube 1 a non-negligible pressure $p_0$ of an inert gas (a rare gas or hydrogen) and by carrying the cold end of the tube at a temperature $t'$, a little lower than $t$, so that the sum of the pressure of the gas in the heated tube and of the vapor pressure of the arsenic at the temperature $t'$ should be about the pressure prevailing in the chamber of the furnace. For example, if the pressure $p_0$ of the neutral gas at room temperature, say 20° C., is 0.10 atmosphere, if $t'$ is equal to 595° C., the pressure of the gas at $$\frac{2Tt'}{T+t'}=759° \text{ C.}$$

which may be taken as the mean temperature of the gas is 0.35 atmosphere. The vapour pressure of arsenic at 595° C. is 0.64 atmosphere and the total pressure is substantially one atmosphere.

Gallium being at the end A in liquid phase, arsenic being condensed at the end B and the tube being filled with arsenic vapour at atmospheric pressure (or more generally at the pressure prevailing in the furnace chamber); the reaction takes place at said end A so that the arsenic distills little by little from B towards A. The time of heating necessarily varies with the mass of the reaction mixture. If for example, 5 grams of gallium arsenide are to be produced, 2.59 grams of arsenic and 2.41 grams of gallium are put in the tube. With the temperatures of 1000° C. for the hotter end and 610° C. for the colder end of the tube as previously mentioned, the duration of the reaction is about 48 hours. It would be 24 hours for a mass of some three grams of gallium arsenide. Generally a complete reaction is not obtained if one starts from proportions strictly stoichiometric and if the temperature of the end B is maintained lower than 610° C. during the entire time of the operation. An arsenide of gallium is then obtained containing a slight excess of metal and which is a semiconductor of the type N. The reaction may be rendered more complete by elevating the temperature of the end B at the end of the operation above 610° C. which, considering the slight quantity of residual arsenic, can be made without serious danger of over pressure. A compound of the type P can even be obtained by taking initially a quantity of arsenic slightly above the stoichiometric, or indeed by introducing into a tube of the same type as 1 an arsenide of the type N prepared in a first operation with a calculated quantity of arsenic. In all cases there is the advantage of withdrawing the contents from the end A of the tube at the end of a certain time, grinding it as finely as possible and then reintroducing it into the same tube with the arsenic that has not yet been reacted, or with a supplementary quantity of arsenic, or into a new tube with a quantity of arsenic calculated from a dosage, either of the arsenic already absorbed in the product or of the arsenic not yet reacted.

The arsenide of gallium thus prepared presents a crystalline aspect similar to that of silicon and germanium. It is a photoconductor with an excitation threshold of 1,1$\mu$ and presents very interesting rectifying characteristics.

The process described also permits preparing under the same conditions the arsenio-antimonides of gallium, of indium or of aluminum. It is sufficient to place at the end A of the tube, besides the arsenic and the metal, for example gallium, the antimonide of gallium prepared by the process of direct fusion of its constituents.

Figure 2:
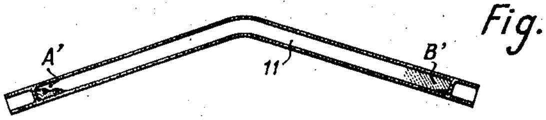
Fig. 2 shows one form of a tube adopted for the preparation of PGa.

In order to prepare by the same process a phosphide such as the phosphide of gallium it is recommended to use in place of the straight tube 1 a tube 11 as shown in Fig. 2 of curved form so that the phosphorus which condenses in liquid form at the end B', in this case at a temperature $t'$ in the vicinity of 280° C., the boiling point of white liquid phosphorus and for example located between 270° and 285° C., can not slide towards the portion A' thus creating by a rapid vaporization dangerous excess pressures.

It is thought that the invention and its advantages will be understood from the foregoing description and it is apparent that various changes may be made in the process, form, construction and arrangement of the parts without departing from the spirit and scope of the invention or sacrificing its material advantages, the forms hereinbefore described and illustrated in the drawings being merely preferred embodiments.

I claim:

1. A process for the manufacture of a compound including a metalloid from the group consisting of arsenic, antimony and phosphorus and a metal from the group consisting of aluminum, gallium and indium, comprising the steps of inserting a quantity of one of said metalloids and a quantity of one of said metals into a refractory tube, exhausing and sealing said tube, disposing said tube in an inclined position with one end thereof lower than the other end thereof and with said quantities of metalloid and metal both in the lower end of said tube, heating said lower end to a temperature of substantially 1000° C., simultaneously heating the upper end of said tube to an elevated temperature not greater than 650° C., at which elevated temperature said metalloid has an equilibrium vapor pressure substantially below its equilibrium vapor pressure at 1000° C., whereby saisd one metalloid distills from said lower end and condenses at the upper end of said tube and exists in said tube in the gaseous state substantially at its equilibrium vapor pressure at said elevated temperature while said metal reacts with said metalloid in the gaseous state, and recovering the compound produced thereby from the tube.

2. A process as set forth in claim 1, in which said metalloid is arsenic, and in which said elevated temperature is between 550° C. and 650° C., whereby the vapor pressure of arsenic in said tube is between one-half and one and one-half atmospheres.

3. A process as set forth in claim 1, in which said elevated temperature is between 600° C. and 620° C., whereby the vapor pressure of arsenic in said tube is substantially atmospheric.

4. A process for the manufacture of an arsenio-antimonide of a metal selected from the group consisting of aluminum, gallium and indium, comprising inserting a quantity of antimonide of said metal, a quantity of arsenic and a quantity of said metal in a refractory tube, exhausting and sealing said tube, disposing said tube in an inclined position with one end of said tube lower than the other end thereof and with said quantities in said lower end, heating said lower end to a temperature of about 1000° C., simultaneously heating the upper end of said tube to a temperature between 550° C. and 650° C. whereby arsenic distills from said lower end to said upper end and condenses at said upper end and is maintained in said tube in both the solid and gaseous states, said arsenio-antimonide being formed at the lower end of said tube, and recovering the product arsenio-antimonide from the tube.

5. A process for the manufacture of a phosphide of a metal of the third column of the periodic table belonging to a group consisting of aluminum, gallium and indium comprising the steps of inserting a quantity of phosphorous and a quantity of one of said metals into a generally curved quartz tube, exhausting and sealing said tube, placing said tube in an inclined position with the central portion elevated above the ends thereof and with said quantities at one end thereof, heating said one end to a temperature of about 1000° C., simultaneously heating the other end of said tube to a temperature between 270° C. and 285° C. whereby phosphorus distills from said one end and condenses in the liquid state at said other end and exists in equilibrium between the condensed liquid and vapor states at a vapor pressure substantially equal to atmospheric pressure, the liquid state phosphorus being prevented from flowing to said one end whereby said metal reacts with phosphorus in the vapor phase at a vapor pressure substantially equal to atmospheric, and recovering the phosphide produced from the tube.

6. A process for the manufacture of a compound including a metalloid from the group consisting of arsenic, antimony and phosphorus and a metal of the group consisting of aluminum, gallium and indium, comprising the steps of inserting a quantity of one of said metalloids and a quantity of one of said metals into a refractory tube, exhausting said tube, introducing a quantity of inert gas into said tube sufficient to produce a pressure in said tube of not substantially greater than one and one-half atmospheres, disposing said tube in an inclined position with one end of said tube lower than the other end thereof and with said quantities of metal and metalloid at the lower end thereof, heating the lower end of said tube to a temperature of about 1000° C., heating the other end of said tube to an elevated temperature not greater than 650° C., at which elevated temperature said metalloid has an equilibrium vapor pressure equal to the difference between the pressure of said inert gas and not substantially greater than one and one-half atmospheres, whereby said one metalloid distills from said lower end and condenses at thr upper end of said tube and exists in said tube in the gaseous state substantially at its equilibrium vapor pressure at said elevated temperature while said metal reacts with said metalloid in the gaseous state, and recovering the compound produced thereby from the tube.

References Cited in the file of this patent

UNITED STATES PATENTS

| | | |
|---|---|---|
| 1,418,984 | Sperr et al. | June 6, 1922 |
| 1,893,296 | Lilliendahl et al. | Jan. 3, 1933 |
| 2,473,703 | Colton | June 21, 1949 |
| 2,561,411 | Pfann | July 24, 1951 |
| 2,597,028 | Pfann | May 20, 1952 |
| 2,607,659 | Rummery | Aug. 19, 1952 |
| 2,719,799 | Christien | Oct. 4, 1955 |

OTHER REFERENCES

Iandelli: "Sulla Struttura . . . InP, InAs e InSB," Estratto dalla Gazzetta Chimica Italiana, vol. 71, Fasc. 1, Roma, 1941.